July 28, 1959 N. A. VOGEL 2,897,484

ACCESS MECHANISM

Filed Jan. 23, 1956

INVENTOR.
NORMAN A. VOGEL

BY John B. Clark

ATTORNEY

United States Patent Office 2,897,484 Patented July 28, 1959

2,897,484

ACCESS MECHANISM

Norman A. Vogel, Palo Alto, Calif., assignor to International Business Machines Corporation, New York, N.Y., a corporation of New York Application January 23, 1956, Serial No. 560,595

6 Claims. (Cl. 340—174)

The present invention relates generally to storage devices and more particularly to access mechanisms associated with such devices.

In magnetic storage devices of the type disclosed in the copending application Serial No. 477,468 filed December 24, 1954, wherein a magnetic transducer is selectively positioned adjacent magnetic recording tracks of various discs, the transducer is positioned adjacent a selected track by first moving it to a position adjacent the disc containing the track and by then moving it over that disc to the track. Before moving the transducer from one track to another track located on a different disc, however, it is obvious that it is necessary to withdraw the transducer from the first disc before moving it to the second disc to thereby prevent damage to the discs, the access mechanism and/or the transducer. Additionally, it will be clear that it is necessary that the access mechanism be in the proper location adjacent the selected disc before the transducer is moved to mesh with the discs since, if this is not the case, the transducer may drive into a disc instead of between discs thereby causing damage. The access mechanism may be controlled by a suitable program to avoid the above-defined mishaps; however, in the event of malfunction, damage may yet result.

Thus, it is one object of the present invention to provide an improved access mechanism.

Another object is to provide an access mechanism of the type described which positively prevents damage due to malfunction.

A further object is to provide a mechanism for selectively positioning a magnetic transducer adjacent tracks of various magnetic recording discs which prevents the transducer assembly from being driven into the disc assembly in the event of malfunction.

Still another object is to provide an access mechanism for positioning a transducer as described having an interlock which positively prevents the access mechanism from moving the transducer assembly from one disc to another unless the assembly is clear of the discs.

A still further object is to provide an access mechanism having an interlock which positively prevents the transducer assembly from being advanced towards the discs unless the mechanism is in a position adjacent the discs, wherein the transducer assembly cannot collide therewith when driven therebetween.

Other objects of the invention will be pointed out in the following description and claims and illustrated in the accompanying drawings which disclose, by way of example, the principle of the invention and the best mode which has been contemplated of applying that principle.

Figures 1, 2, 3:
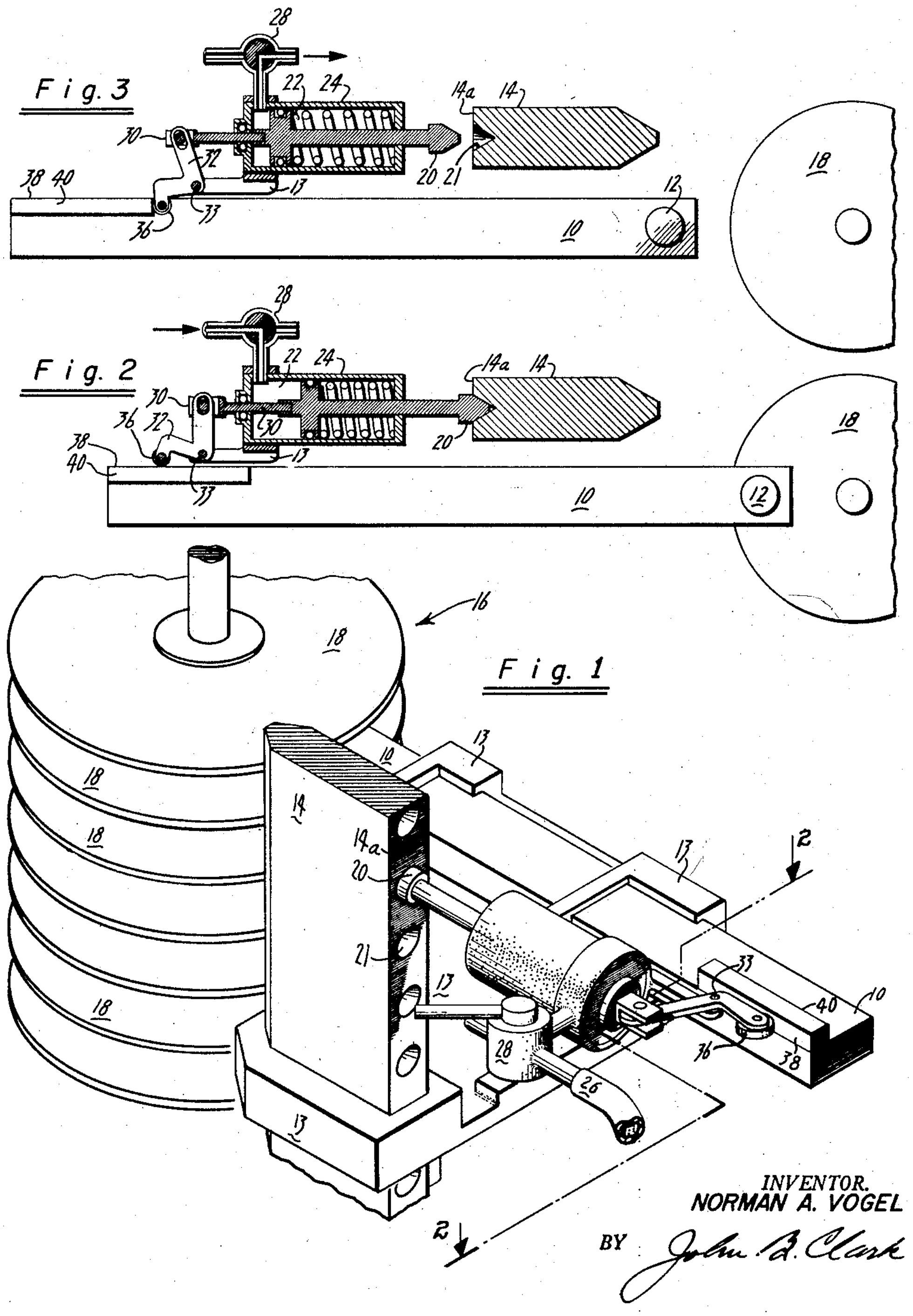
Fig. 1 is a diagrammatic, perspective view of portions of the access mechanism.
Fig. 2 is a section taken along line 2—2 of Fig. 1.
Fig. 3 is similar to Fig. 2, but shows the access mechanism in a different operational position.

Referring now to Fig. 1, the portions of the access mechanism there shown comprise an arm 10 arranged to support a transducer 12 (Fig. 2) near one extremity thereof. The arm 10 is supported by a suitable carriage 13 (Fig. 1) which is slidably mounted on a way 14 supported adjacent an array 16 of discs 18. The arm 10 is supported for movement relative to the carriage 13 for positioning the transducer 12 adjacent a selected track on that disc 18 corresponding to the position of the carriage along the way. Thus, the carriage position selects the disc, and the position of the arm 10 relative to the carriage 13 determines which of the several tracks on a selected disc is to cooperate with the transducer. Positioning of the carriage and arm is controlled in any convenient manner, such as is shown in the aforementioned copending application or in the copending application Serial No. 555,006 filed December 23, 1955, and since the positioning mechanism forms no part of the present invention, it is not disclosed herein.

The way 14 is provided with a plurality of conical indentations 21 in the face 14a thereof which are arranged to receive a conical detent 20. The detent 20 is formed integrally with a piston 22 (Fig. 2) slidably disposed in a pneumatic cylinder 24, which cylinder is fixedly supported by the carriage 13 in a suitable manner for movement therewith. An air hose 26, connected to a source of air (not shown) under suitable pressure, is connected through a valve 28 to the interior of the cylinder 24; and when the carriage is in position adjacent a selected disc 18, means (not shown) are provided to actuate the valve 28 to permit air flow therethrough and into the cylinder 24, thereby driving the piston 22 and detent 20 forward to seat the detent in an indentation 21 corresponding to the selected disc. This results in locking the carriage to the way 14 and prevents movement of the carriage relative to the way until the detent is withdrawn.

The indentations 21 are so spaced that when the detent 20 is inserted therein, it is safe for the arm 10 to be moved in mesh with the discs 18, i.e., they are in a position such that the arm will not drive into a disc when the arm is moved to a selected track on the disc. The piston 22 is linked to an arm 30 for moving the arm longitudinally therewith, the arm being arranged to extend through a suitably sealed aperture provided in the rear wall of the air chamber of the cylinder 24. A bell crank 32 is pivotally mounted on the carriage 13, as at 33, and one arm of the bell crank 32 is linked to the arm 30. The other arm of the bell crank 32 is provided with a roller 36 arranged either to ride on a surface 38 of a member 40 secured to the arm 10, as shown in Fig. 2, when the arm is being moved relative to the carriage, or to be disposed in front of said member, as shown in Fig. 3, thereby preventing movement of the arm relative to the carriage.

Referring to Fig. 3, it will be seen that the detent 20 may be withdrawn only when the arm 10 is in a position such that it clears the disc array 16, i.e., in a position referred to as its home position. The bell crank 32 is then pivoted sufficiently in a counter-clockwise direction to dispose the roller 36 in front of the member 40, thereby preventing the arm from being moved towards the disc array. When, however, the detent is fully inserted within an indentation 21, the roller 36 is pivoted in a clockwise direction, clear of the member 40 and rides on the surface 38 when the arm is moved. It should also be noted that when and as long as the roller 36 rests on the surface 38, the detent 20 cannot be withdrawn. This prevents the carriage from being moved vertically as viewed in Fig. 1 until the arm is in its home position. Similarly, until the detent 20 is fully inserted in one of the indentations 21, which is the case while the carriage is being positioned, the arm is locked in its home position and it cannot be moved therefrom until the detent is seated. Thus, by means of the present invention, possible damage to the disc array, the access mechanism and/or the magnetic transducer which may result from malfunction which tends to position the carriage while the arm is meshed with the discs or which tends to position the arm prior to the positioning of the carriage, is positively avoided.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An access mechanism comprising in combination a first member, means for supporting said first member for movement along a first path, first means for locking said first member to resist movement along said first path, a second member, means for supporting said second member for movement along a second path, said second member being movable from a home position to positions along said second path, second means arranged to lock said second member in said home position, and means interconnecting said first and second locking means to cause the unlocking action of said first means to be dependent upon the locking action of said second means.

2. An access mechanism comprising a first member supported for movement along a first path, a second member supported by said first member for movement therewith, said second member having a home position and being supported by said first member for movement relative thereto from said home position to positions along a second path, locking means movable to lock said first member to resist movement along said first path, and means movable simultaneously with said locking means and engageable with said second member for preventing movement of said first member until said second member is in said home position.

3. In an access mechanism having a carriage positionable along a way and an arm mounted in supporting relationship with said carriage and adapted to be moved relative thereto, an interlock device mounted for movement with said carriage, said interlock device having a first locking element acting between said carriage and said way operable to lock said carriage to said way, a second locking element acting between said carriage and said arm operable to lock said arm in a predetermined position, said means interconnecting said elements to cause the locking action of said first element to be substantially simultaneous with the unlocking action of said second element.

4. In an access mechanism having a carriage positionable along a way and an arm mounted in supporting relationship with said carriage and adapted to be moved relative thereto, an interlock device mounted for movement with said carriage, said interlock device having a first locking element acting between said carriage and said way for locking said carriage to said way, a second locking element acting between said carriage and said arm for locking said arm in a predetermined position, first actuating means urging said first element to an unlocking position and said second element to a locking position, second actuating means for selectively overcoming the urging of said first actuating means to move said first element to a locking position, and means interconnecting said elements to cause the unlocking action of said first element caused by said first actuating means to be dependent on said arm being moved to said predetermined position in the event said second actuating means is rendered inoperable.

5. An access mechanism comprising in combination a carriage positionable along a way, an arm mounted in supporting relationship with said carriage and adapted to be moved relative thereto, an interlock device mounted for movement with said carriage, said interlock device having a first locking element acting between said carriage and said way for locking said carriage to said way, a second locking element acting between said carriage and said arm for locking said arm in a predetermined position, biasing means urging said first element to an unlocking position and said second element to a locking position, actuating means selectively operable to overcome said biasing means to move said first element to a locking position, and means interconnecting said elements to cause the unlocking action of said first element to be dependent on the locking action of said second element in the event said actuating means is rendered inoperable.

6. A recording apparatus comprising in combination a plurality of coaxially disposed, axially spaced recording media each having a plurality of circumferentially disposed, radially spaced recording tracks, a transducer positionable from each of said tracks to another preselected said track, a way member disposed parallel to said axis and spaced radially therefrom, a carriage member positionable axially to preselected locations along said way corresponding to said spaced media, an arm member supported by said carriage member for movement radially with respect to said axis, means for mounting said transducer in the distal end of said arm member, a mechanical interlock device mounted on said carriage member operable in one position to lock said carriage member to said way and in another position to lock said arm member to said carriage member, and means for actuating said device from said one position under the control of the radial position of said arm member.

References Cited in the file of this patent

UNITED STATES PATENTS

| | | |
|---|---|---|
| 1,504,227 | Gent | Aug. 12, 1924 |
| 2,398,067 | Winkler | Apr. 19, 1946 |
| 2,623,126 | Graybill et al. | Dec. 23, 1952 |